(12) United States Patent
Vohlídal et al.

(10) Patent No.: US 11,642,820 B2
(45) Date of Patent: May 9, 2023

(54) TOOL FOR PLASTIC INJECTION MOLDING AND METHOD FOR MANUFACTURING THE TOOL

(71) Applicant: Magna Exteriors (Bohemia) s.r.o., Liberec (CZ)

(72) Inventors: Ondřej Vohlídal, Liberec (CZ); Radim Zdárský, Liberec (CZ); Vítězslav Kadlec, Liberec (CZ); Vítězslav Brožek, Turnov (CZ)

(73) Assignee: MAGNA EXTERIORS (BOHEMIA) S.R.O., Liberec (CZ)

( * ) Notice: Subject to any disclaimer, the term of this patent is extended or adjusted under 35 U.S.C. 154(b) by 236 days.

(21) Appl. No.: 16/675,613

(22) Filed: Nov. 6, 2019

(65) Prior Publication Data
US 2020/0147846 A1  May 14, 2020

(30) Foreign Application Priority Data
Nov. 9, 2018 (DE) .......................... 102018219192.1

(51) Int. Cl.
| | | |
|---|---|---|
| *B29C 45/26* | (2006.01) | |
| *B29C 33/02* | (2006.01) | |
| *B29C 33/38* | (2006.01) | |
| *B29L 31/00* | (2006.01) | |
| *B33Y 80/00* | (2015.01) | |

(52) U.S. Cl.
CPC .......... *B29C 45/2602* (2013.01); *B29C 33/02* (2013.01); *B29C 33/3842* (2013.01); *B29L 2031/757* (2013.01); *B33Y 80/00* (2014.12)

(58) Field of Classification Search
CPC ..... B29C 33/02; B29C 33/04; B29C 33/3828; B29C 33/3842; B29C 33/40; B29C 33/565; B29C 45/2602; B29C 45/2673; B29C 45/37; B29C 45/7312; B29C 2045/7325; B29C 2045/2636; B29C 2033/385; B29C 2033/3864
See application file for complete search history.

(56) References Cited

U.S. PATENT DOCUMENTS

| | | | |
|---|---|---|---|
| 4,209,289 A | | 6/1980 | Newcomb et al. |
| 4,295,628 A | * | 10/1981 | Kupf ...................... B29C 45/26 249/103 |
| 4,648,546 A | * | 3/1987 | Gellert ................... B23K 1/008 228/161 |

(Continued)

FOREIGN PATENT DOCUMENTS

| | | |
|---|---|---|
| CN | 103009023 A | 4/2013 |
| CN | 106113234 A | 11/2016 |

(Continued)

OTHER PUBLICATIONS

No Author Identified, 3-D Printed Injection Molds, 60 Shots and That is it, Mar. 24, 2014, 4 pages, Stratasys Inc., Eden Prairie, MN, United States, English Translation Included.

(Continued)

*Primary Examiner* — Emmanuel S Luk
(74) *Attorney, Agent, or Firm* — Dickinson Wright PLLC

(57) ABSTRACT

Tool for plastic injection molding consisting of at least one metallic mold and at least one plastic carrier, wherein the metallic mold and the plastic carrier are connected to one another by an adhesive layer.

5 Claims, 3 Drawing Sheets

(56) References Cited

U.S. PATENT DOCUMENTS

| | | | | |
|---|---|---|---|---|
| 5,213,747 | A * | 5/1993 | Lippert | B29C 33/56 264/226 |
| 5,260,014 | A * | 11/1993 | Holton | B29C 33/04 264/134 |
| 5,324,473 | A * | 6/1994 | Baresich | B29C 45/00 264/327 |
| 5,496,168 | A * | 3/1996 | Renwick | B29C 45/2725 425/572 |
| 5,641,448 | A * | 6/1997 | Yeung | B29C 64/135 264/401 |
| 5,775,402 | A * | 7/1998 | Sachs | B22F 5/007 164/4.1 |
| 6,780,362 | B1 * | 8/2004 | Story | C11D 13/14 425/185 |
| 7,413,433 | B2 * | 8/2008 | Blundy | B29C 45/2725 425/572 |
| 9,902,108 | B1 * | 2/2018 | Wurmfeld | B29C 64/165 |
| 10,900,136 | B2 * | 1/2021 | Li | B23P 15/02 |
| 2008/0115904 | A1 * | 5/2008 | Aversenti | B22D 23/003 264/219 |
| 2010/0320694 | A1 * | 12/2010 | Gromotka | B29C 45/14385 277/316 |
| 2011/0081437 | A1 * | 4/2011 | Felker | B29C 45/14819 425/129.1 |
| 2013/0001831 | A1 * | 1/2013 | Ray | B28B 7/342 249/1 |
| 2013/0025810 | A1 * | 1/2013 | Castle | B29C 64/188 164/15 |
| 2014/0175698 | A1 * | 6/2014 | McRoskey | B29C 41/04 264/219 |
| 2014/0195001 | A1 * | 7/2014 | Grohowski, Jr. | A61L 27/56 419/30 |
| 2014/0339395 | A1 * | 11/2014 | Kumpf | B29C 33/38 249/177 |
| 2016/0023375 | A1 * | 1/2016 | Uram | C04B 35/44 501/153 |
| 2016/0039006 | A1 * | 2/2016 | Amstutz | B22D 19/00 428/650 |
| 2016/0067766 | A1 * | 3/2016 | Verreault | C22F 1/002 164/71.1 |
| 2016/0250778 | A1 * | 9/2016 | Halla | B29C 33/02 264/219 |
| 2017/0008236 | A1 * | 1/2017 | Easter | C04B 35/5603 |
| 2017/0043518 | A1 | 2/2017 | Narayanaswamy | |
| 2017/0081500 | A1 * | 3/2017 | Bredt | C08B 31/063 |
| 2017/0106614 | A1 * | 4/2017 | Hiraki | B60C 11/00 |
| 2017/0126087 | A1 * | 5/2017 | Soderberg | H02K 5/02 |
| 2017/0266687 | A1 * | 9/2017 | Lessley | B29C 48/2566 |
| 2018/0071980 | A1 * | 3/2018 | Lomasney | C25D 5/617 |
| 2018/0215077 | A1 * | 8/2018 | Isse | B29C 33/3828 |
| 2018/0226917 | A1 * | 8/2018 | Jacques | E04B 2/72 |
| 2018/0290342 | A1 * | 10/2018 | Dikovsky | B29C 33/40 |
| 2018/0370080 | A1 * | 12/2018 | McCarthy | B33Y 10/00 |
| 2019/0086154 | A1 * | 3/2019 | Adriany | B22F 5/007 |
| 2019/0264453 | A1 * | 8/2019 | Petri | E04G 11/04 |
| 2019/0291322 | A1 * | 9/2019 | Hahnlen | B33Y 80/00 |
| 2019/0337205 | A1 * | 11/2019 | Jain | B33Y 80/00 |
| 2019/0343280 | A1 * | 11/2019 | Arredondo | A47B 88/994 |
| 2019/0351575 | A1 * | 11/2019 | Dugbenoo | B28B 7/346 |
| 2020/0061890 | A1 * | 2/2020 | Rusakov | B29C 45/40 |
| 2020/0086537 | A1 * | 3/2020 | Baranowski | B29C 45/73 |
| 2021/0370552 | A1 * | 12/2021 | Waldestrand | B23P 15/24 |

FOREIGN PATENT DOCUMENTS

| | | |
|---|---|---|
| DE | 102013008421 A1 | 11/2014 |
| DE | 102013222232 A1 | 4/2015 |
| EP | 3444093 A1 | 2/2019 |

OTHER PUBLICATIONS

German Office Action from the German Patent Office for related DE Application No. 102018219192.1 dated Mar. 27, 2019, 6 pages.

* cited by examiner

TOOL FOR PLASTIC INJECTION MOLDING AND METHOD FOR MANUFACTURING THE TOOL

CROSS-REFERENCE TO RELATED APPLICATIONS

This application claims the benefit and priority of German Patent Application No. 102018219192.1, filed Nov. 9, 2018. The entire disclosure of the above application is incorporated herein by reference.

FIELD

The present invention relates to a tool for plastic injection molding and a method for manufacturing a tool for plastic injection molding.

BACKGROUND

This section provides background information related to the present disclosure which is not necessarily prior art.

Simple injection molding tools consist of two halves, these being the nozzle side and the ejector side, both of which are themselves constructed from a number of plates. The nozzle side is the tool half which does not move during production. In the majority of cases, the half shells of the cavities, also known as mold inserts or mold cavities, are incorporated into the mold plate of the two-plate tools on the nozzle side. The components which belong to the gating system, for example the sprue bushing, are likewise situated on the mold plate on the nozzle side for the most part in conjunction with a cold runner distribution system. The hot runner manifold with hot runner nozzles for manufacturing the injection molded components is a further subassembly of the mold plate on the nozzle side. The tool is secured to the machine clamping plate. In the case of tools with higher tool temperatures, an insulating plate is also installed ahead of the clamping plate. This prevents the exchange of heat to the clamping plate of the machine. The tools consist of metal and are produced according to CAD data from the tool manufacturer.

Small molds for plastic injection molding are increasingly manufactured by the 3D printing method. In this case, for example, a metal powder is welded into metal components under a protective gas atmosphere.

A tool for the hot forming of metal sheets, which has a functional layer applied to a base block of the tool in a laser sintering process, is known from DE 102014200234 A1. A freely formable cooling grid is embodied in this functional layer. It is also known, furthermore, for example from US 2018290342A1, to produce molds for plastic injection molding from plastic using 3D printers. This is naturally subject to restrictions by the injection temperature and the choice of materials.

A mold insert for an injection mold is known from DE 10 2013 008 421 A1. The manufacture of a tool, which is used for the production of toothbrushes, is described in the printed publication. A first and a second mold insert are used, wherein the first mold insert is metallic and the second mold insert can consist of a plastic.

The manufacture of a tool by means of a 3D printing process is known from US 2017/0043518A1.

The object of the invention is to improve the manufacture of plastic injection molding molds.

SUMMARY

This section provides a general summary of the disclosure, and is not a comprehensive disclosure of its full scope or all of its features.

The object is accomplished by a tool for plastic injection molding consisting of at least one metallic mold and at least one plastic carrier, wherein the metallic mold and the plastic carrier are connected to one another by an adhesive layer or by adhesion.

A tool is easily manufactured by the combination of a plastic carrier with a metallic mold, which is not required to possess great thickness.

It is advantageous in this case for at least two metallic molds to be assembled and connected in a positive-locking manner by means of connection areas. Smaller individual components, which can then be connected appropriately to one another, can be manufactured as a result.

It is also advantageous in the case of the plastic carrier for at least two plastic carriers to be assembled and connected in a positive-locking manner by means of connection areas.

The plastic carrier can thus also be assembled from a number of components and is therefore more easily produced.

In order to cool the tool, it is advantageous for the plastic carrier and/or the metallic mold to exhibit recesses which serve as cooling ducts.

The object is further accomplished by a method for manufacturing a tool for plastic injection molding, wherein the at least one metallic mold is manufactured by a 3D printing process.

The manufacture of a metallic mold is greatly simplified by the 3D printing process, and the contour for the component for subsequent manufacturing is obtained in only a short time.

The method is even further optimized by manufacturing the at least one plastic carrier likewise by a 3D printing process.

The inventive method for manufacturing a tool for plastic injection molding involves the following steps:
In step S1 at least two metallic molds (2, 2') are manufactured by a 3D printing process,
In step S2 the metallic molds (2, 2') are assembled into a metallic contour mold (20, 20') and are connected to one another at the connection areas (3, 3'),
In step S3 at least one plastic carrier (5, 5') is produced by a 3D printing process,
In step S4 the plastic carrier (5, 5') is adhesively bonded to the metallic mold contour (20, 20')
Step S5 involves the installation of the finished tools in the plastic injection molding machine.

As an alternative step S3 is replaced by step S30, which involves the injection back molding of the metallic contour mold, which is adhesively bonded to the metal.

It is also advantageous for the method, furthermore, if the plastic carrier is assembled and connected from a number of component parts by means of connection areas.

The manufacture of the cooling ducts takes place advantageously by the manufacture or formation of recesses in the at least one plastic carrier and/or the metallic molds.

In an alternative or additional embodiment, the cooling ducts are printed together with the metallic mold and as such are a component part of the metallic mold.

This embodiment has the advantage that the rigidity of the metallic contour mold is increased.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The invention is explained in the following exposition and is represented by figures.

Corresponding reference numerals indicate corresponding parts throughout the several views of the drawings.

DETAILED DESCRIPTION

Figure 1A:
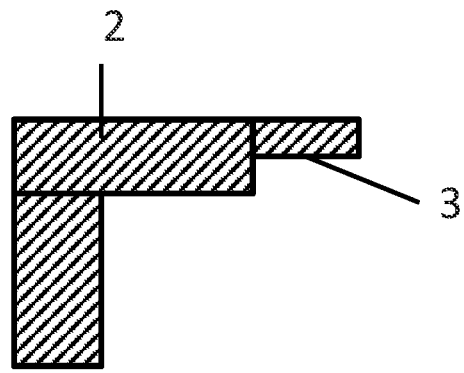
FIG. 1A depicts the first step of the inventive embodiment including a first embodiment of a connection.

Example embodiments will now be described more fully with reference to the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The manufacture of a tool mold for the plastic injection molding begins with the printing of a metallic mold 2, which corresponds to the contour of the component to be manufactured subsequently.

On the basis of the CAD data, a metallic mold 2 is produced by a suitable process, for example the laser sintering process, as represented in the sectional view of FIG. 1A.

The metallic mold 2 in this case has a small wall thickness of about 1.5 mm and does not have to be self-supporting. It can be manufactured in any shape.

The 3D printing of metal cannot take place in molds of any size at the present time. If it is wished to manufacture a larger component, further steps must thus be taken in order to be able to manufacture the large injection molding tool.

The metallic mold 2 accordingly has a connection area 3, which is represented as a tongue in the left-hand embodiment. This tongue is fitted precisely to the connection area 3' of an already present further metallic mold 2' and is attached by adhesive bonding, welding or soldering.

Figure 1B:
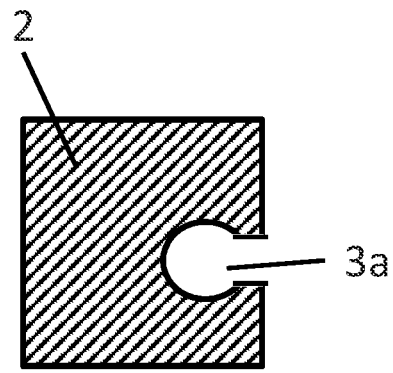
FIG. 1B depicts the first step of the inventive embodiment including an alternate embodiment of a connection.
Figure 2:
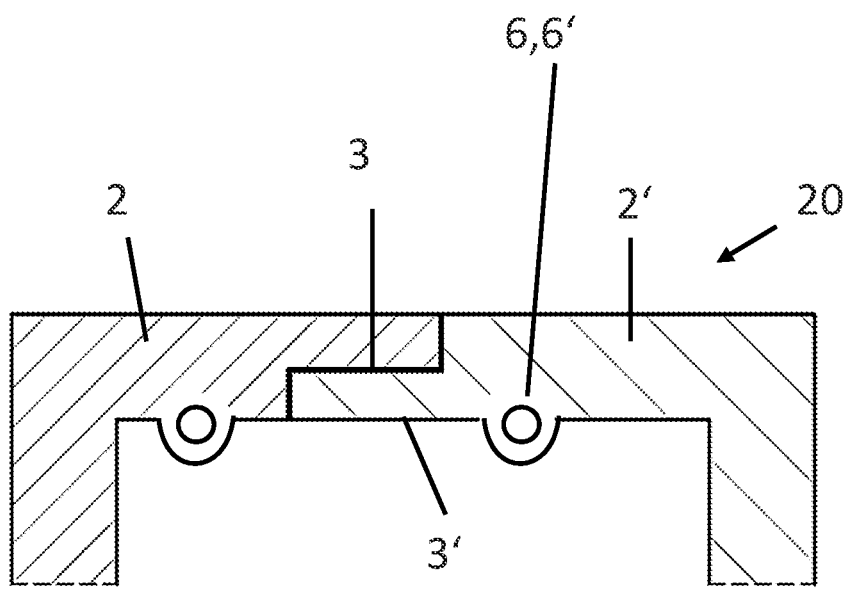
FIG. 2 depicts the assembly of the metal mold.

An alternative connection is represented in FIG. 1B and comprises a keyhole-shaped recess 3a for the connection area 3, into which a matching counter piece can be introduced. Further connection possibilities include: jigsaw locking, push-button connection, lateral overlapping, etc.

Metallic molds 2, 2', etc., are thus combined into an overall form, of which the size corresponds to the component to be manufactured. As a result, a metallic contour mold 20, which undergoes further processing, is obtained from the molds 2, 2', etc.

Since the metallic contour mold 20 is not stable, it is connected to a plastic carrier. The plastic carrier 5, 5' is either manufactured in a 3D printing process or is milled, for example, from a hard plastic block. It exhibits recesses 6 for cooling ducts, which are either produced at the same time during the 3D printing or are introduced by post-processing of the plastic carrier. The recesses in this case are grooves in the plastic carrier which are of semi-circular configuration, as depicted in the example in FIG. 3.

The plastic carrier 5, 5' is adhesively bonded to the metallic contour mold 20, 20'. The adhesive layer 4 extends in two directions and occupies only the recesses 6 for the cooling ducts.

The metallic mold contour 20, 20' acquires stability through the plastic carrier 5,5' and can be installed in a tool machine.

The plastic carrier can also be manufactured from multiple parts by the 3D printing process and can then be assembled and connected via connection areas 7.

Figure 3:
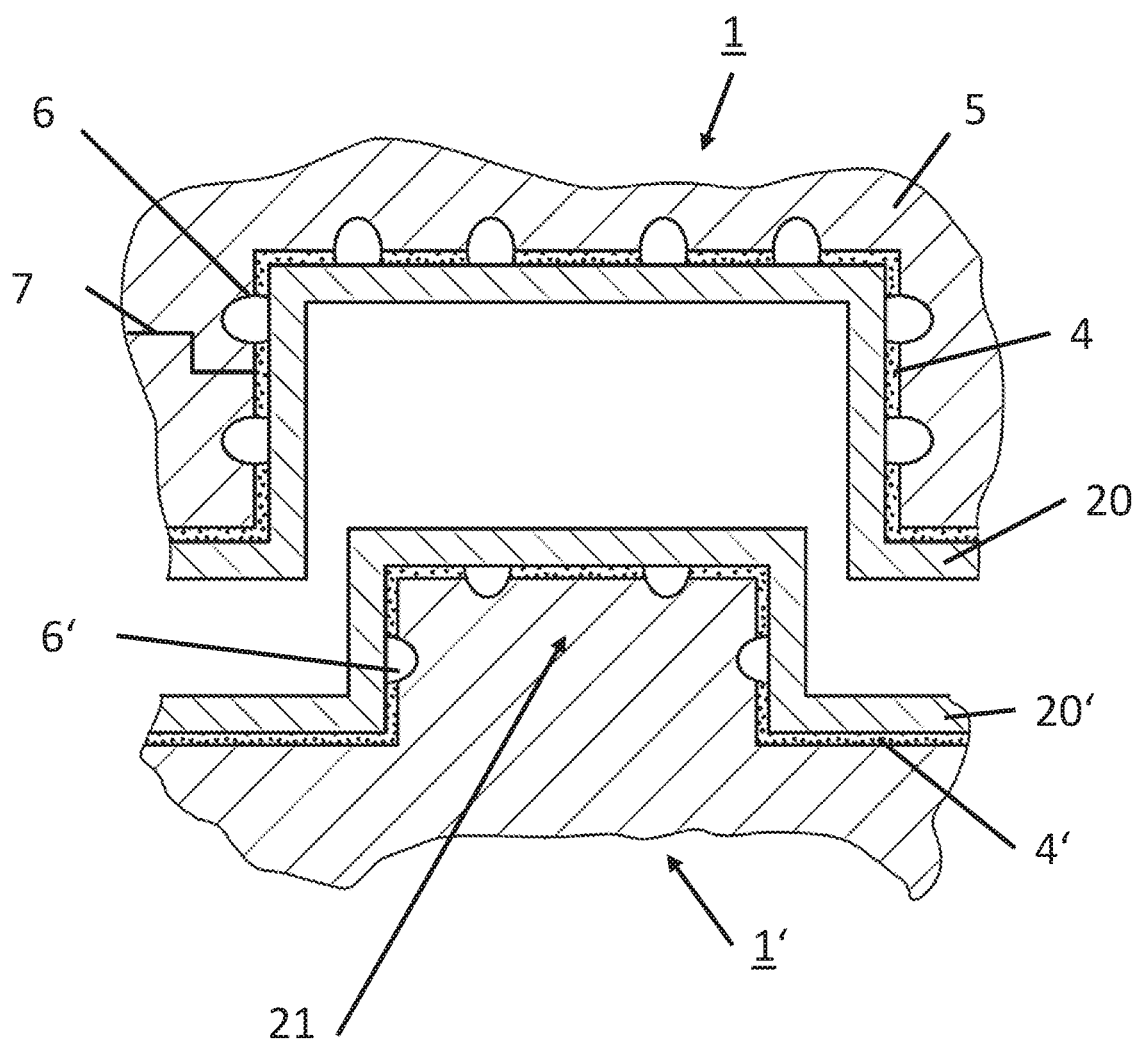
FIG. 3 depicts a complete tool mold.

In the example depicted in FIG. 3, the upper part is the tool 1, which is fixedly in-stalled in the injection molding machine, whereas the lower part represents the moving tool 1', which is displaced upwards for the injection process and is dis-placed downwards once more for demolding of the component.

A further variant is for the metallic contour mold 20, 20' to be cast with a plastic material, which is possible for special metallic contour molds 20, 20'. These con-tour molds 20, 20' have an embodiment like the lower tool according to FIG. 3, which depicts an internal space 21 which can be simply injection back-molded with plastic. However, it must be possible to preserve the form of the metallic contour mold. The step of manufacturing a separate plastic carrier and the subsequent bonding is thus no longer required.

The manufacture of the cooling ducts can take place by 3D printing of the metallic molds or both in the metallic mold and in the plastic carrier.

Figure 4:
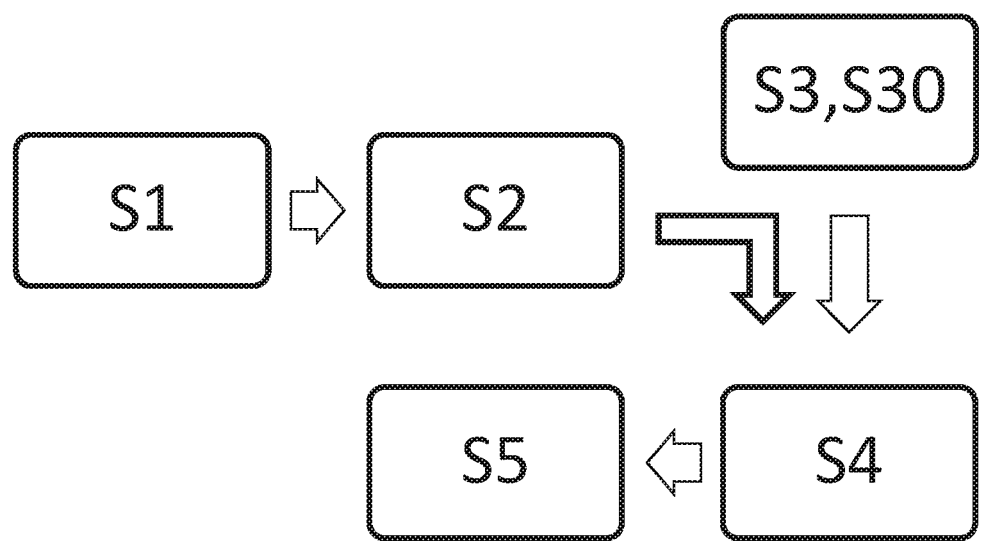
FIG. 4 depicts the steps in the manufacturing process.

The process sequence for manufacturing a plastic injection molding tool is represented in FIG. 4.

In step S1 at least one metallic mold 2, 2', etc., is manufactured by a 3D printing process.

In step S2 the metallic molds are assembled into a metallic contour mold and are connected to one another at the connection areas.

In step S3 the plastic carrier 5 is produced by a 3D printing process. The manufacture of the cooling ducts by the production or forming of recesses also takes place in this step, if required.

In step S30, as an alternative to step S3, the metallic contour mold is injection back-molded and as a result adheres adhesively to the metal.

In step S4 the plastic carrier is adhesively bonded to the metallic mold contour.

Step S5 involves the installation of the finished tool parts in the plastic injection molding machine.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

DESIGNATIONS

1, 1 tool
2, Z metallic mold

3, 3' connection area
4 adhesive layer
5, 5' plastic carrier
6 recesses
7 connection area
20, 20' metallic contour mold
21 internal space

What is claimed is:

1. A method for manufacturing a tool for plastic injection molding, comprising:
    manufacturing at least a first set of metallic molds and a second set of metallic molds facing one another and defining a mold cavity therebetween;
    connecting each of the metallic molds of each of the first and second sets of metallic molds to at least another of the metallic molds at connection areas;
    the first and second sets of metallic molds each defining a mold contour surface which defines the mold cavity which corresponds to a contour of a component to be injection molded in the mold cavity;
    the first and second sets of metallic molds further defining a rear surface opposite the mold contour surface;
    producing a first set of plastic carriers with a 3D printing process, and connecting at least two of the plastic carriers of the first set of plastic carriers to one another in a positive locking manner, and producing a second set of plastic carriers with a 3D printing process, and connecting at least two of the plastic carriers of the second set of plastic carriers to one another in a positive locking manner;
    adhering the first set of plastic carriers to the rear surface of the first set of metallic contour molds and adhering the second set of plastic carriers to the rear surface of the second set of metallic contour molds;
    defining cooling recesses along faces of the first and second set of plastic carriers which are oriented toward the rear surfaces of the metallic molds while producing the at least two plastic carriers with the 3D printing process, wherein the cooling recesses serve as cooling ducts during the plastic injection molding process; and
    installing the finished tools in a plastic injection molding machine.

2. The method according to claim 1, wherein producing the at least two plastic carriers includes injecting plastic for the plastic carriers directly onto the metallic contour mold.

3. The method as set forth in claim 1, wherein the metallic mold contour includes at least a portion which is non-linear.

4. The method according to claim 1, wherein the connection areas of the metallic molds each comprise a keyhole-shaped recess in a first of the metallic molds, and a counter piece having a shape corresponding to the recess of the first of the metallic molds extending from a second of the metallic molds for being receive in the recess of the first of the metallic molds, and wherein connecting each of the metallic molds includes fitting the counter pieces of at least one of the metallic molds into the recess of at least one of the metallic molds.

5. The method according to claim 1 wherein manufacturing the metallic molds includes 3D printing the metallic molds.

* * * * *